(12) United States Patent
Martin et al.

(10) Patent No.: US 11,821,364 B2
(45) Date of Patent: Nov. 21, 2023

(54) SHAPED CAVITY AT INTERFACE BETWEEN JOURNAL BEARING AND ROTOR

(71) Applicant: Pratt & Whitney Canada Corp., Longueuil (CA)

(72) Inventors: Bruno Martin, Saint-Jean-sur-Richelieu (CA); Julien Simard-Bergeron, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 11 days.

(21) Appl. No.: 17/408,010

(22) Filed: Aug. 20, 2021

(65) Prior Publication Data

US 2023/0054748 A1 Feb. 23, 2023

(51) Int. Cl.
*F02C 7/36* (2006.01)
*F16H 57/04* (2010.01)
(Continued)

(52) U.S. Cl.
CPC .............. *F02C 7/06* (2013.01); *F01D 25/166* (2013.01); *F02C 7/36* (2013.01); *F16H 57/0479* (2013.01);
(Continued)

(58) Field of Classification Search
CPC ........ F16C 17/10–26; F16C 17/00–035; F16C 2240/42; F16C 32/0659; F16H 1/28–48;
(Continued)

(56) References Cited

U.S. PATENT DOCUMENTS 2,598,476 A * 5/1952 Wightman .......... F16C 33/1065
384/398
2,625,448 A * 1/1953 Underwood .......... F16C 17/026
384/291
(Continued)

FOREIGN PATENT DOCUMENTS

CN 105221713 A * 1/2016
DE 3024306 A1 * 1/1982
(Continued)

OTHER PUBLICATIONS

EP search report for EP22191554.9 published Feb. 22, 2023.

*Primary Examiner* — Topaz L. Elliott
(74) *Attorney, Agent, or Firm* — GETZ BALICH LLC (57) ABSTRACT

An apparatus is provided for a turbine engine. This turbine engine apparatus includes a journal bearing extending axially along and circumferentially about an axis. The journal bearing extends radially between an inner side and an outer side. The journal bearing includes a bore, a passage and a groove. The bore extends axially within the journal bearing and is formed by the inner side. The passage extends radially within the journal bearing and is fluidly coupled with the bore and the groove. The groove is arranged at the outer side. The groove extends longitudinally within the journal bearing between a first end and a second end. The groove extends axially within the journal bearing between a first side and a second side. An axial distance between the first side and the second side changes as the groove extends longitudinally between the first end and the second end.

20 Claims, 9 Drawing Sheets

(51) Int. Cl.
*F01D 25/16* (2006.01)
*F02C 7/06* (2006.01)

(52) U.S. Cl.
CPC .... *F05D 2240/54* (2013.01); *F05D 2250/711* (2013.01); *F05D 2250/712* (2013.01); *F05D 2260/40311* (2013.01)

(58) Field of Classification Search
CPC .......... F16H 57/042–0432; F02C 7/06; F05D 2240/54; F05D 2260/40311
See application file for complete search history.

(56) References Cited

U.S. PATENT DOCUMENTS

| | | | | |
|---|---|---|---|---|
| 3,287,072 | A * | 11/1966 | Buske | F16C 33/1075 384/286 |
| 4,201,176 | A * | 5/1980 | Lustgarten | F16C 33/1085 184/6.5 |
| 4,553,857 | A * | 11/1985 | Ney | F16C 17/028 384/293 |
| 6,056,509 | A * | 5/2000 | Nakayama | B63H 21/386 416/174 |
| 6,176,621 | B1 * | 1/2001 | Naitoh | F16C 33/1065 384/291 |
| 6,223,616 | B1 | 5/2001 | Sheridan | |
| 7,883,438 | B2 * | 2/2011 | McCune | F16H 57/04 184/6.12 |
| 8,246,503 | B2 | 8/2012 | Sheridan | |
| 8,298,108 | B2 | 10/2012 | Nishida | |
| 8,777,793 | B2 | 7/2014 | Sheridan | |
| 8,894,529 | B2 | 11/2014 | McCune | |
| 8,900,083 | B2 | 12/2014 | Sheridan | |
| 10,234,018 | B2 | 3/2019 | Hasting | |
| 10,662,879 | B2 | 5/2020 | Desjardins | |
| 10,760,677 | B2 | 9/2020 | Brillon | |
| 10,935,076 | B2 | 3/2021 | Martin | |
| 2010/0317478 | A1 | 12/2010 | McCune | |
| 2012/0108380 | A1 * | 5/2012 | Dinter | F03D 80/70 475/159 |
| 2013/0035190 | A1 * | 2/2013 | McCune | F16C 33/02 464/7 |
| 2017/0009810 | A1 * | 1/2017 | Futae | F16C 17/18 |
| 2017/0276168 | A1 * | 9/2017 | Seki | F16C 9/02 |
| 2017/0328404 | A1 * | 11/2017 | Morreale | F16C 17/02 |
| 2019/0234509 | A1 | 8/2019 | Desjardins | |
| 2019/0360356 | A1 | 11/2019 | Savaria | |
| 2020/0271059 | A1 * | 8/2020 | Lemoine | F16H 1/2809 |
| 2020/0300340 | A1 | 9/2020 | Desjardins | |
| 2020/0347882 | A1 * | 11/2020 | Martin | F16H 57/043 |

FOREIGN PATENT DOCUMENTS

| | | | | |
|---|---|---|---|---|
| DE | 3519984 | A * | 10/1986 | .......... F16C 33/1075 |
| EP | 339304 | A * | 11/1989 | .............. F16C 33/10 |
| EP | 3093514 | A1 * | 11/2016 | |
| GB | 956828 | A * | 4/1964 | .......... F16C 33/1075 |
| JP | 2016191420 | A * | 11/2016 | |
| JP | 2022040701 | A * | 3/2022 | ............. F03D 15/00 |
| WO | WO-2021063437 | A1 * | 4/2021 | ............. F03D 15/00 |

* cited by examiner

SHAPED CAVITY AT INTERFACE BETWEEN JOURNAL BEARING AND ROTOR

TECHNICAL FIELD

This disclosure relates generally to rotational equipment and, more particularly, to lubrication between a journal bearing and a rotor.

BACKGROUND INFORMATION

Rotational equipment such as a gas turbine engine may include a journal bearing for rotatably supporting a rotor. Various journal bearing configurations are known in the art. While these known journal bearing configurations have various benefits, there is still room in the art for improvement.

SUMMARY

According to an aspect of the present disclosure, an apparatus is provided for a turbine engine. This turbine engine apparatus includes a journal bearing extending axially along and circumferentially about an axis. The journal bearing extends radially between an inner side and an outer side. The journal bearing includes a bore, a passage and a groove. The bore extends axially within the journal bearing and is formed by the inner side. The passage extends radially within the journal bearing and is fluidly coupled with the bore and the groove. The groove is arranged at the outer side. The groove extends longitudinally within the journal bearing between a first end and a second end. The groove extends axially within the journal bearing between a first side and a second side. An axial distance between the first side and the second side changes as the groove extends longitudinally between the first end and the second end.

According to another aspect of the present disclosure, another apparatus is provided for a turbine engine. This turbine engine apparatus includes a journal bearing, a rotor and a cavity. The journal bearing extends axially along and circumferentially about an axis. The rotor is mounted on the journal bearing and rotatable about the axis. The cavity is formed by and extends radially between the journal bearing and the rotor. The cavity extends longitudinally between a first end and a second end. The cavity extends axially between a first side and a second side. The axial distance between the first side and the second side changes as the cavity extends longitudinally between the first end and the second end.

According to still another aspect of the present disclosure, another apparatus is provided for a turbine engine. This turbine engine apparatus includes a journal bearing, a rotor and a cavity. The journal bearing extends axially along and circumferentially about an axis. The rotor is mounted on the journal bearing and rotatable about the axis. The cavity is formed by and extends radially between the journal bearing and the rotor. The cavity extends longitudinally between a first end and a second end. The cavity extends axially between a first side and a second side. The first side and/or the second side may be configured with a non-straight geometry when viewed in a plane tangent to a cylindrical surface forming a side of the cavity.

The journal bearing may include a groove that at least partially forms the cavity.

The rotor may include a groove that at least partially forms the cavity.

The axial distance for at least a portion of the groove may decrease as the groove extends longitudinally away from the second end and towards the first end.

The first end may be an upstream end of the groove. The second end may be a downstream end of the groove.

The first end may be a downstream end of the groove. The second end may be an upstream end of the groove.

The axial distance for a second portion of the groove may increase as the groove extends longitudinally away from the second end and towards the first end.

The axial distance may decrease as the groove extends longitudinally from the second end.

The axial distance may decrease as the groove extends longitudinally to the first end.

The first side may converge towards the second side as the groove extends longitudinally between the second end and the first end.

The first side of the groove and/or the second side of the groove may have a straight geometry.

The first side of the groove and/or the second side of the groove may have a curved geometry.

The first side of the groove and/or the second side of the groove may be concave.

The first side of the groove and/or the second side of the groove may be convex.

An outlet from the passage to the groove may be axially centered between the first side and the second side.

An outlet from the passage to the groove may be axially between a longitudinal centerline of the groove and the first side or the second side.

The apparatus may also include a rotor mounted on and rotatably supported by the journal bearing.

The apparatus may also include an epicyclic geartrain that includes the journal bearing.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
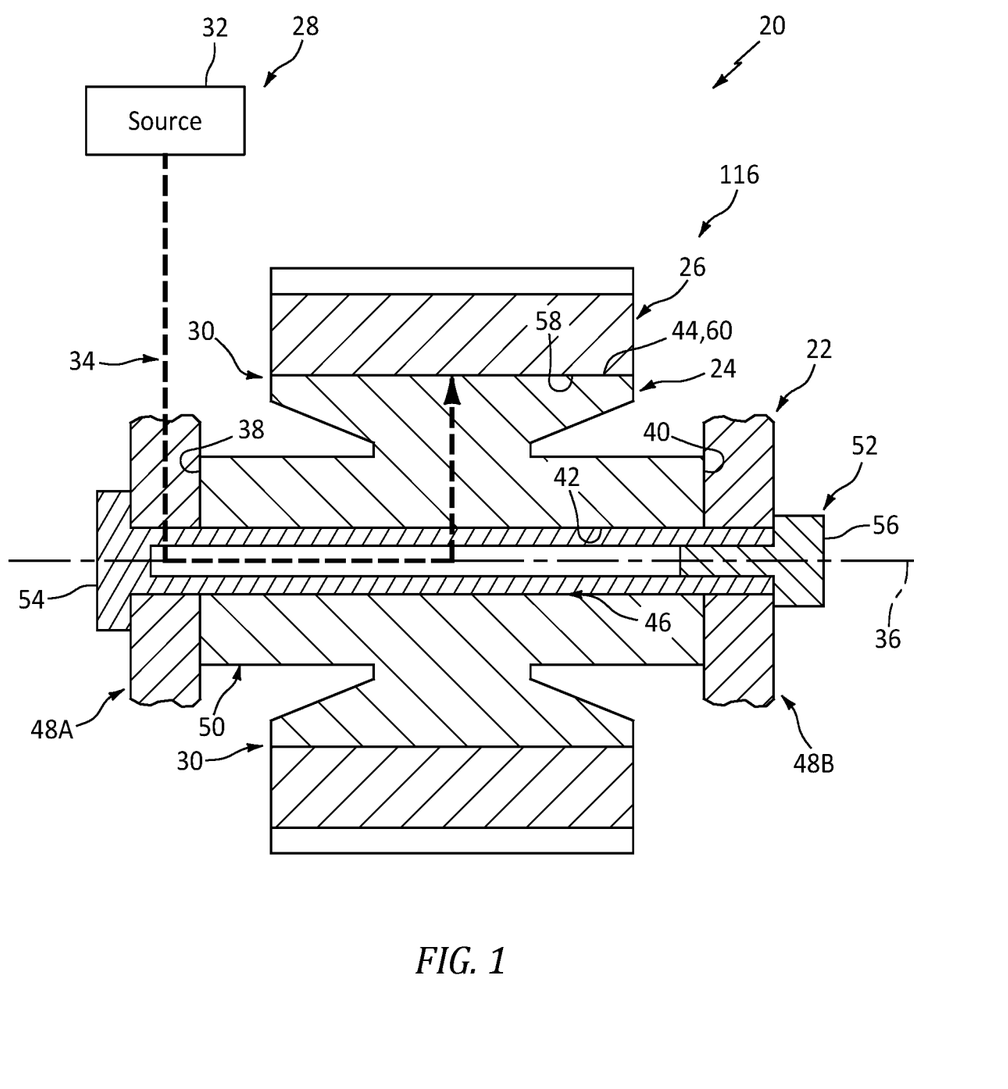
FIG. 1 is a partial side sectional illustration of an apparatus for rotational equipment.

FIG. 1 illustrates an apparatus 20 for rotational equipment. This rotational equipment may be configured as a gas turbine engine for an aircraft propulsion system, an exemplary embodiment of which is described below in further detail (e.g., see FIG. 14). However, the rotational equipment apparatus 20 of the present disclosure is not limited to such an aircraft or gas turbine engine application. The rotational equipment apparatus 20, for example, may alternatively be configured with rotational equipment such as an industrial gas turbine engine, a wind turbine, a water turbine or any other apparatus in which a journal bearing is provided for rotatably supporting a rotor.

The rotational equipment apparatus 20 of FIG. 1 includes a support structure 22, a journal bearing 24 (e.g., a plain bearing) and a rotor 26. The rotational equipment apparatus 20 of FIG. 1 also includes a lubrication system 28 configured to provide lubricant (e.g., oil) to an interface 30 between the rotor 26 and the journal bearing 24. This lubrication system 28 of FIG. 1 includes a lubricant source 32 and a lubricant circuit 34.

The support structure 22 of FIG. 1 is configured to support the journal bearing 24. This support structure 22, for example, may be configured as a carrier for an epicyclic geartrain. This carrier may be a rotating carrier where the epicyclic geartrain is configured as a planetary geartrain. The carrier may be a stationary carrier where the epicyclic geartrain is configured as a star geartrain. The present disclosure, however, is not limited to such exemplary support structure configurations. The support structure 22, for example, may alternatively be configured as a frame, a case or another housing structure.

The journal bearing 24 of FIG. 1 extends axially along a rotational axis 36 of the rotor 26 between and to a first side 38 of the journal bearing 24 and a second side 40 of the journal bearing 24. The journal bearing 24 extends circumferentially about (e.g., completely around) the rotational axis 36, providing the journal bearing 24 with a full-hoop (e.g., tubular) body. The journal bearing 24 extends radially between and to an inner side 42 of the journal bearing 24 and an outer side 44 of the journal bearing 24. The bearing inner side 42 forms an outer peripheral side of an internal bearing bore 46 within the journal bearing 24. This bearing bore 46 extends axially along the rotational axis 36 and the bearing inner side 42 within (e.g., an into and/or through) the journal bearing 24.

The journal bearing 24 of FIG. 1 is arranged and spans axially between first and second sections 48A and 48B (generally referred to as "48") of the support structure 22. A base 50 of the journal bearing 24 is mounted to the support structure 22. The bearing base 50 of FIG. 1, for example, is fixedly attached to the first and the second sections 48 by a fastener assembly 52. The fastener assembly 52 of FIG. 1 includes a hollow support pin 54 and a retainer 56 (e.g., a bolt). The present disclosure, however, is not limited to the foregoing exemplary journal bearing fastening technique.

The rotor 26 is configured to rotate about its rotational axis 36. More particularly, the rotor 26 is mounted on and rotatably supported by the journal bearing 24 at the bearing outer side 44. A cylindrical inner surface 58 of the rotor 26, for example, is engaged with (e.g., contacts) and is slidable circumferentially along a cylindrical outer surface 60 of the journal bearing 24, which bearing outer surface 60 is located at the bearing outer side 44. This interface 30 between the rotor inner surface 58 and the bearing outer surface 60 is lubricated with the lubricant provided by the lubrication system 28.

The rotor 26 may be any rotating body within the rotational equipment. The rotor 26, for example, may be a gear such as, but not limited to, an intermediate gear for the epicyclic geartrain. This intermediate gear may be a planet gear where the epicyclic geartrain is configured as the planetary geartrain. The intermediate gear may be a star gear where the epicyclic geartrain is configured as the star geartrain. The present disclosure, however, is not limited to such exemplary rotor configurations. The rotor 26, for example, may alternatively be configured as a wheel, a pulley, a disk, a hub or a shaft.

Figure 2:
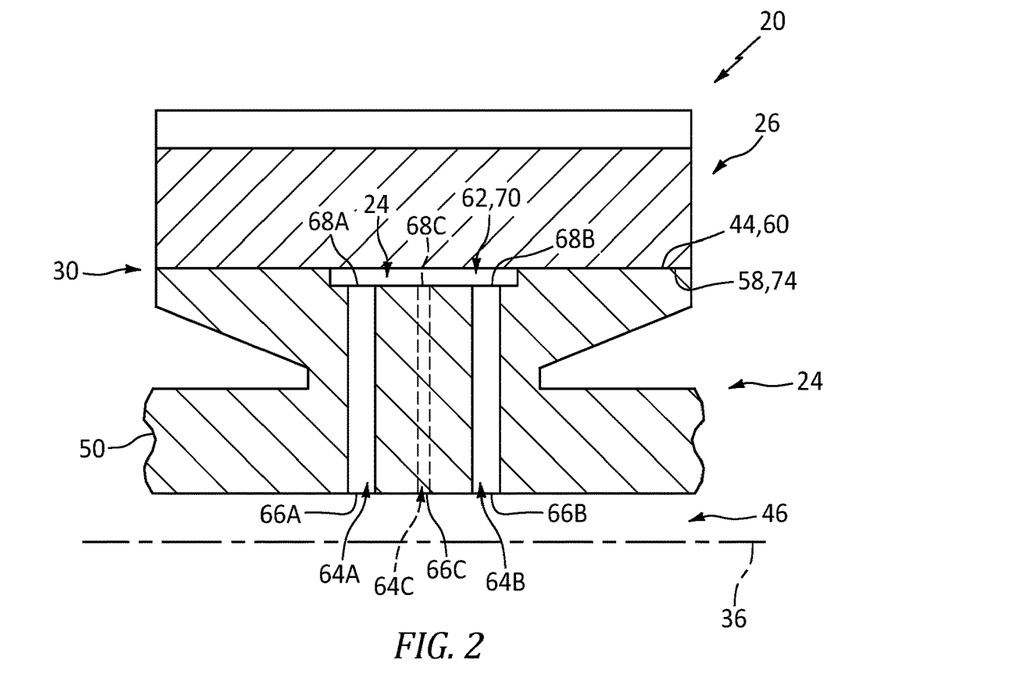
FIG. 2 is a partial side sectional illustration of a rotor mounted on a journal bearing with a groove in the journal bearing.

Referring to FIG. 2, the lubricant circuit 34 includes a lubricant cavity 62 for feeding the lubricant to the interface 30 between the bearing outer surface 60 and the rotor inner surface 58. The lubricant circuit 34 also includes one or more supply passages 64A-C (generally referred to as "64") in the journal bearing 24, which supply passages 64 are between and fluidly couple the lubricant source 23 and the lubricant cavity 62. Each of the supply passages 64A-C of FIG. 2 extends radially within (e.g., through) a tubular sidewall of the journal bearing 24 from an inlet 66A-C at (e.g., on, adjacent or proximate) the bearing bore 46 to an outlet 68A-C at the lubricant cavity 62.

Figure 3:
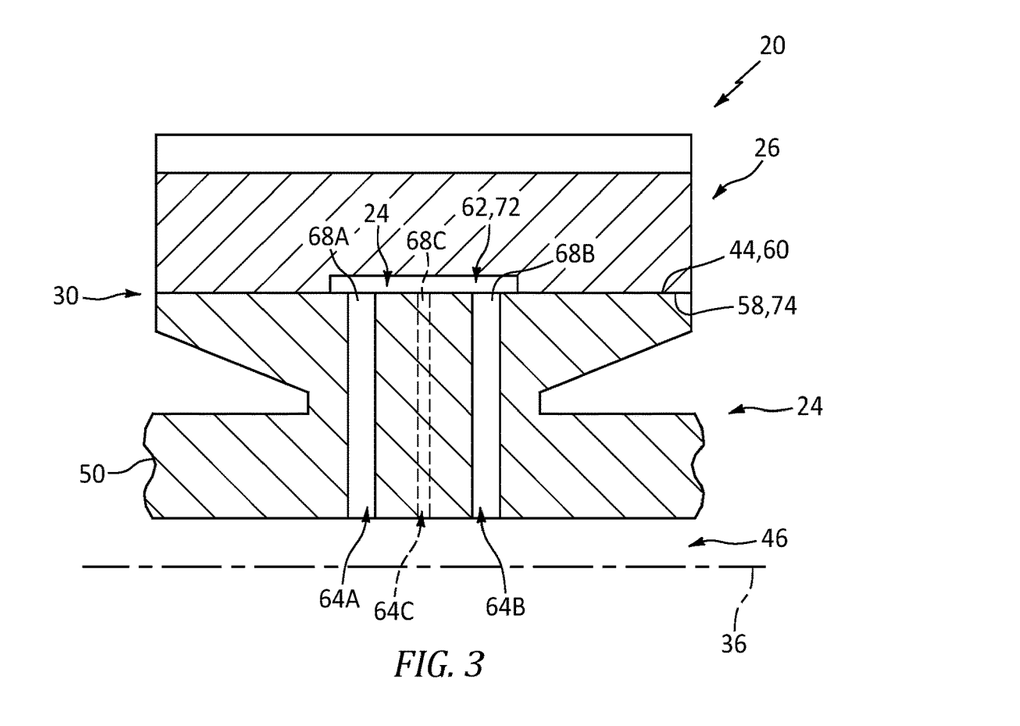
FIG. 3 is a partial side sectional illustration of the rotor mounted on the journal bearing with the groove in the rotor.

The lubricant cavity 62 of FIG. 2 is formed by and extends radially between the journal bearing 24 and the rotor 26 at the interface 30 therebetween. More particularly, the lubricant cavity 62 of FIG. 2 is formed by a journal bearing groove 70 in the journal bearing 24 at its bearing outer side 44, and the rotor inner surface 58. The present disclosure, however, is not limited to such an exemplary lubricant cavity configuration. For example, referring to FIG. 3, the lubricant cavity 62 may alternatively be formed by a rotor groove 72 in the rotor 26 at an inner side 74 of the rotor 26, and the bearing outer surface 60. However, for ease of description, the lubricant cavity 62 is described below with respect to embodiments including the bearing groove 70 (e.g., see FIG. 2); however, these same teachings may also be applied to embodiments including the rotor groove 72 (e.g., see FIG. 3). The rotor groove 72 of FIG. 3, for example, may have a similar or an identical configuration as the bearing groove configurations described below.

Figure 4:
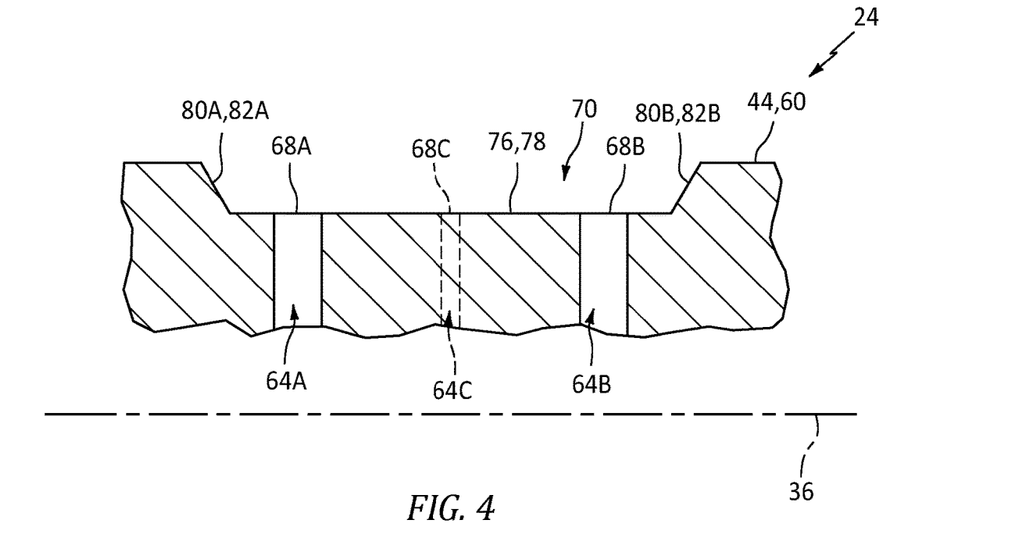
FIG. 4 is a side sectional illustration of a portion of the journal bearing at the groove.
Figure 5:
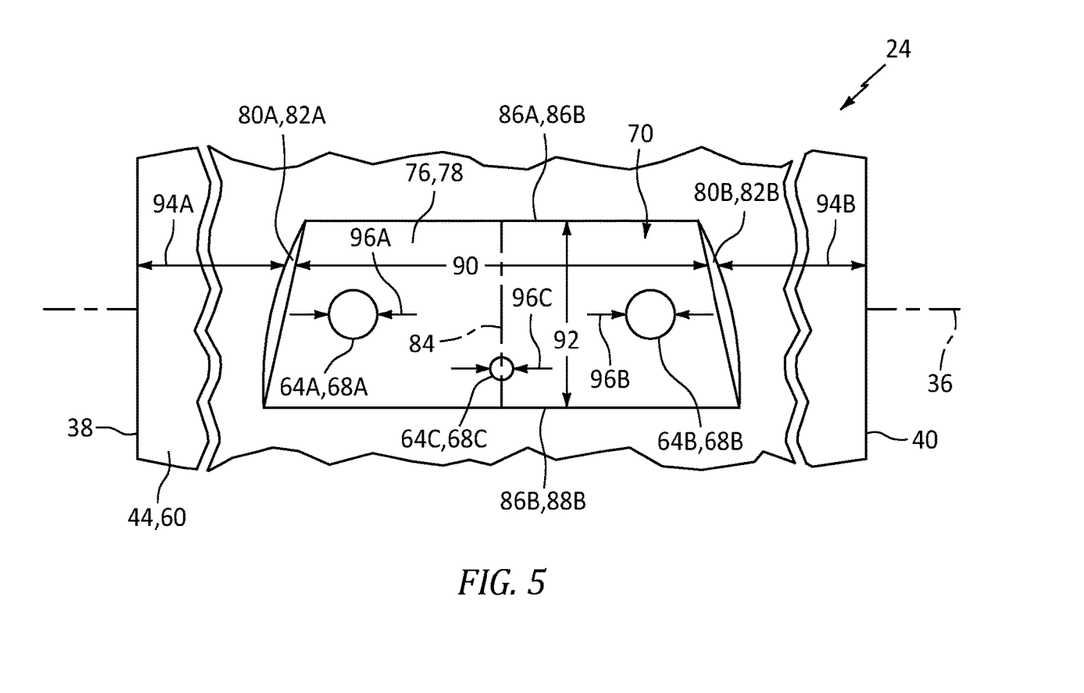
FIG. 5 is an illustration of a side portion of the journal bearing at the groove.

Referring to FIG. 4, the bearing groove 70 projects radially into the journal bearing 24 from the bearing outer surface 60 to a (e.g., flat or curved) groove bottom surface 76 at a radial inner side 78 of the bearing groove 70. The bearing groove 70 extends axially along the rotational axis 36 within the journal bearing 24 between and to axially opposing groove side surfaces 80A and 80B (generally referred to as "80") respectively at axially opposing sides 82A and 82B (generally referred to as "82") of the bearing groove 70. Referring to FIG. 5 the bearing groove 70 extends longitudinally along a longitudinal centerline 84 of the bearing groove 70 between and to longitudinally opposing ends 86A and 86B (generally referred to as "86") of the bearing groove 70. This longitudinal centerline 84 may extend circumferentially about the rotational axis 36 and/or generally tangentially to the journal bearing 24 and its bearing outer surface 60. The longitudinal centerline 84 of FIG. 5 is perpendicular to the rotational axis 36; however, the present disclosure is not limited to such an exemplary orientation.

Figure 6:
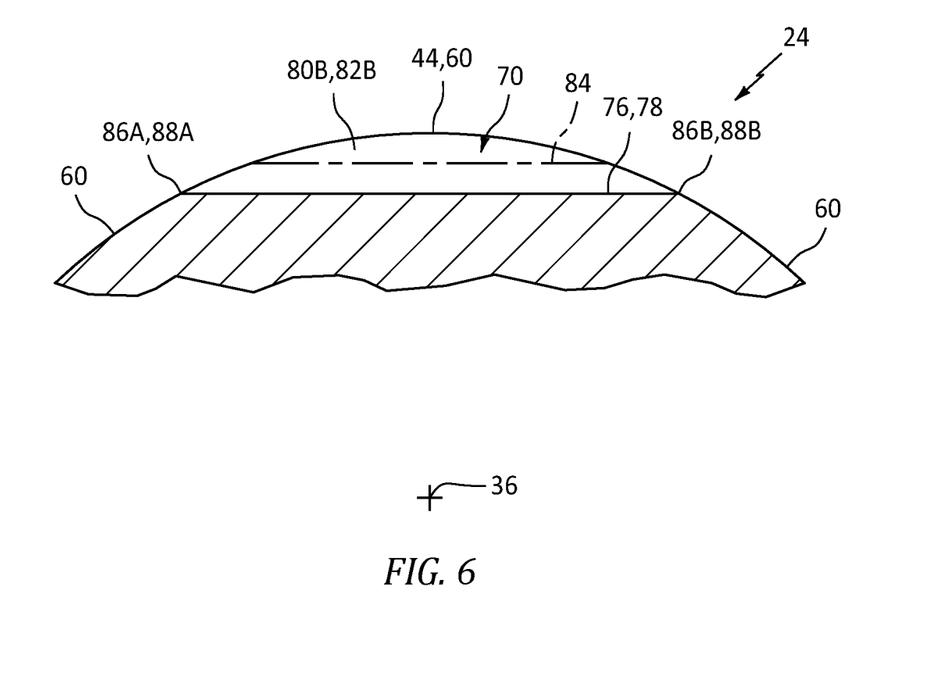
FIG. 6 is a cross-sectional illustration of a portion of the journal bearing at the groove where the groove has a flat bottom surface.
Figure 7:
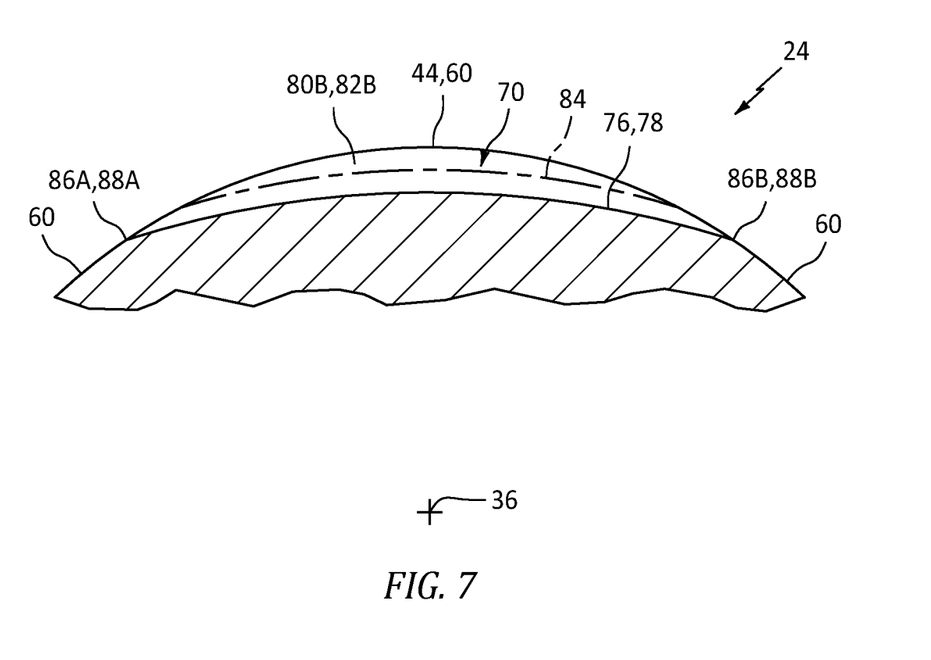
FIG. 7 is a cross-sectional illustration of a portion of the journal bearing at the groove where the groove has a curved bottom surface.

The groove bottom surface 76 of FIG. 5 has a polygonal geometry when viewed, for example, in a plane parallel with the longitudinal centerline 84 and/or the rotational axis 36, and/or tangent to the bearing outer surface 60; e.g., plane of FIG. 5. This polygonal geometry of FIG. 5 has a trapezoidal shape; e.g., an isosceles trapezoidal shape. The present disclosure, however, is not limited to such an exemplary polygonal geometry nor to polygonal geometries in general as described below in further detail. Referring to FIG. 6, the groove bottom surface 76 may have straight (e.g., flat) cross-sectional geometry when viewed, for example, in a plane perpendicular to the rotational axis 36; e.g., plane of FIG. 6. Alternatively, referring to FIG. 7, the groove bottom surface 76 may have a non-straight (e.g., a curved, splined, etc.) cross-sectional geometry when viewed, for example, in the plane perpendicular to the rotational axis 36.

Referring to FIG. 6, the groove bottom surface 76 may meet the bearing outer surface 60 at a respective edge 88A, 88B at each of the groove ends 86. The groove bottom surface 76 may thereby be circumferentially adjacent and/or contiguous with the bearing outer surface 60 at the groove ends 86.

Each of the groove side surfaces 80 may have a partially circular (e.g., circular minor segment) geometry when viewed, for example, in the plane perpendicular to the rotational axis 36. The present disclosure, however, is not limited to such an exemplary groove side surface configuration. For example, referring to FIG. 7, each of the groove side surfaces 80 may have a crescent shaped geometry when viewed, for example, in the plane perpendicular to the rotational axis 36.

Referring to FIG. 5, the bearing groove 70 and the groove bottom surface 76 have an axial width 90 and a longitudinal length 92. The axial width 90 is an axial distance measured between the groove side surfaces 80/the groove sides 82. The longitudinal length 92 is a longitudinal distance measured between the groove ends 86. This longitudinal length 92 of FIG. 5 different (e.g., less) than a maximum (e.g., largest) value of the axial width 90 (e.g., at the groove second end 86B) and/or a minimum (e.g., smallest) value of the axial width 90 (e.g., at the groove first end 86A); however, the present disclosure is not limited to such an exemplary dimensional relationship.

The value of the axial width 90 of FIG. 5 changes (e.g., increases or decreases) as the bearing groove 70 extends longitudinally along its longitudinal centerline 84 between the groove ends 86. The axial width value of FIG. 5, in particular, (e.g., steadily, continuously) decreases as the bearing groove 70 extends longitudinally from the groove second end 86B to the groove first end 86A. The groove side surfaces 80 and the groove sides 82 thereby axially converge towards one another as the bearing groove 70 extends longitudinally from the groove second end 86B to the groove first end 86A. This arrangement provides the bearing groove 70 with an axially tapered geometry.

The bearing groove 70 is axially displaced from the bearing first side 38 by an axial first distance 94A. A value of this first distance 94A changes (e.g., decreases or increases) as the bearing groove 70 extends longitudinally along its longitudinal centerline 84 between the groove ends 86. The first distance value of FIG. 5, in particular, (e.g., steadily, continuously) increases as the bearing groove 70 extends longitudinally from the groove second end 86B to the groove first end 86A. The value of the first distance 94A may change inversely in proportion with the value of the axial width 90.

The bearing groove 70 is axially displaced from the bearing second side 40 by an axial second distance 94B. A value of this second distance 94B changes (e.g., decreases or increases) as the bearing groove 70 extends longitudinally along its longitudinal centerline 84 between the groove ends 86. The second distance value of FIG. 5, in particular, (e.g., steadily, continuously) increases as the bearing groove 70 extends longitudinally from the groove second end 86B to the groove first end 86A. The value of the second distance 94B may change inversely in proportion with the value of the axial width 90.

Figure 8A:
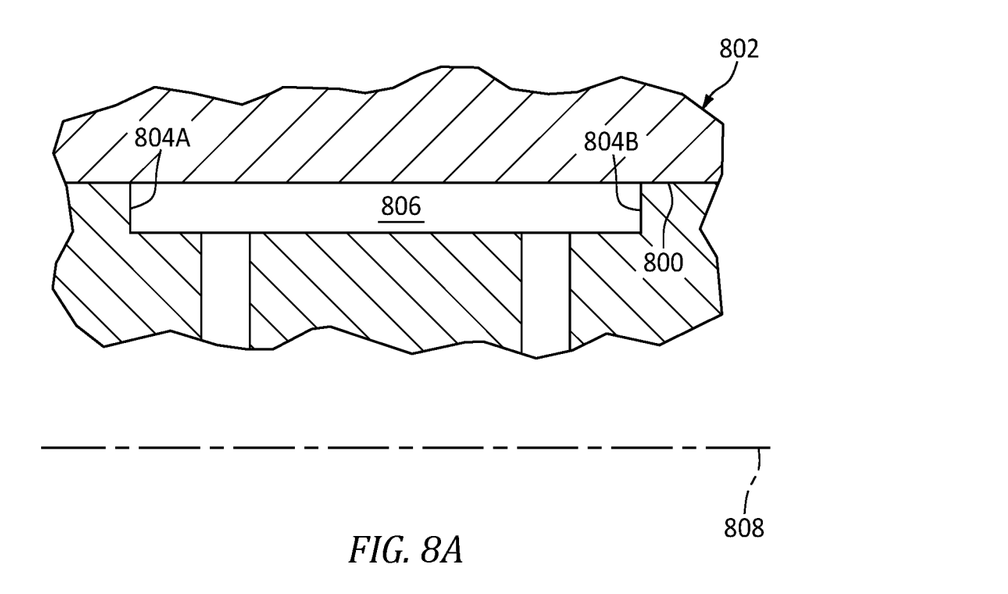
FIG. 8A is a side sectional illustration of another rotor mounted on a journal bearing with a groove in the journal bearing.
Figure 8B:
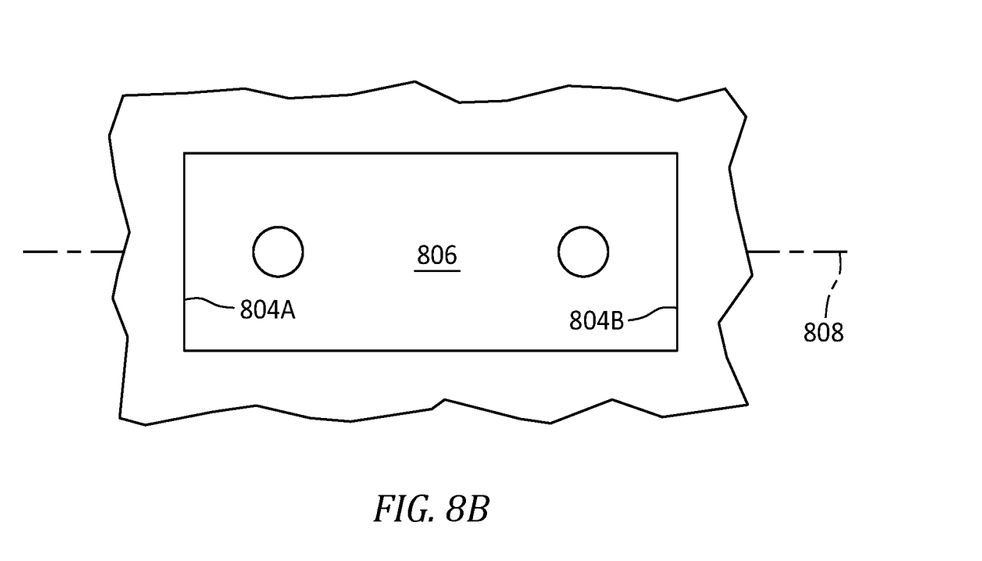
FIG. 8B is an illustration of a side portion of the journal bearing in FIG. 8A at the groove.

During operation of the assembly in FIG. 2, lubricant provided by the lubricant source 23 (see FIG. 1) is directed into the bearing groove 70 and the lubricant cavity 62 through the supply passages 64. The lubricant within the bearing groove 70/the lubricant cavity 62 seeps/controllably leaks into a slight radial clearance between the bearing outer surface 60 and the rotor inner surface 58 to lubricate the sliding contact between those surfaces 58 and 60; e.g., provide a thin bearing film between the surfaces 58 and 60. The tapered configuration of the bearing groove 70/the axially varying configuration of the groove sides 82/the groove side surfaces 80 (e.g., see FIG. 5) may reduce or prevent lubricant cavitation (e.g., creation of bubbles in the lubricant) along the groove sides 82. Such lubricant cavitation may damage the rotor 26 and/or the journal bearing 24. For example, referring to FIGS. 8A and 8B, lubricant cavitation may pit an inner surface 800 of a rotor 802 along sides 804A and 804B of a bearing groove 806 where, for example, those groove sides 804A and 804B are perpendicular to an axis 808 of rotation of the rotor 802. Furthermore, even where cavitation may occur in the lubricant within the bearing groove 70/the lubricant cavity 62 of the present disclosure, the changing axial position of the groove side 82/the groove side surface 80 along the longitudinal centerline 84 (e.g., see FIG. 5) distribute such cavitation along a larger swath of the bearing inner surface 58 thereby reducing negative effects of the lubricant cavitation.

Lubricant cavitation may also be reduced by spreading lubricant delivery out axially across the bearing groove 70/the lubricant cavity 62. The passage outlets 68 of FIG. 5, for example, are spread axially across the bearing groove 70. By distributing the lubricant in this manner, the lubricant may fill regions within the bearing groove 70/the lubricant cavity 62 (see FIG. 2) which may otherwise be susceptible to formation of gas bubbles/cavitation.

The first side passage 64A and its outlet 68A are axially offset towards the groove first side 82A. More particularly, the first side passage 64A and its outlet 68A are axially between the longitudinal centerline 84 and the groove first side 82A. The first side passage 64A and its outlet 68A may be approximately longitudinally centered between the groove first end 86A and the groove second end 86B.

However, the present disclosure is not limited to such an exemplary spatial arrangement.

The second side passage 64B and its outlet 68B are axially offset towards the groove second side 82B. More particularly, the second side passage 64B and its outlet 68B are axially between the longitudinal centerline 84 and the groove second side 82B. The second side passage 64B and its outlet 68B may be approximately longitudinally centered between the groove first end 86A and the groove second end 86B. However, the present disclosure is not limited to such an exemplary spatial arrangement.

The intermediate passage 64C and its outlet 68C are axially between the first side passage 64A and its outlet 68A and the second side passage 64B and its outlet 68B. The intermediate passage 64C and its outlet 68C, for example, may be axially aligned with the longitudinal centerline 84. The intermediate passage 64C and its outlet 68C are arranged longitudinally between the passages 64A and 64B/the outlets 68A and 68B and one of the groove ends 86; e.g., the groove second end 86B in FIG. 5.

The intermediate passage outlet 68C has an intermediate passage outlet dimension 96C; e.g., width, diameter. This intermediate passage outlet dimension 96C may be different (e.g., less) than a dimension 96A (e.g., width, diameter) of the first side passage outlet 68A and/or a dimension 96B (e.g., width, diameter) of the second side passage outlet 68B. The first side passage outlet dimension 96A may be equal to the second side passage outlet dimension 96B. The present disclosure, however, is not limited to the foregoing exemplary dimensional relationship.

In some embodiments, referring to FIG. 5, one or each of the groove sides 82/the groove side surfaces 80 may have a straight geometry when viewed in a reference plane, which reference plane may be parallel with the longitudinal centerline 84 and/or the rotational axis 36, and/or tangent to the bearing outer surface 60; e.g., plane of FIG. 5. Each groove side 82/groove side surface 80 of FIG. 5, for example, follows a straight trajectory between its longitudinal ends. In other embodiments, referring to FIGS. 9 and 10, the one or each of the groove sides 82/the groove side surfaces 80 may have a non-straight geometry (e.g., a curved, splined, compound, etc. geometry) when viewed in the reference plane; e.g., plane of FIGS. 9 and 10.

Figure 9:
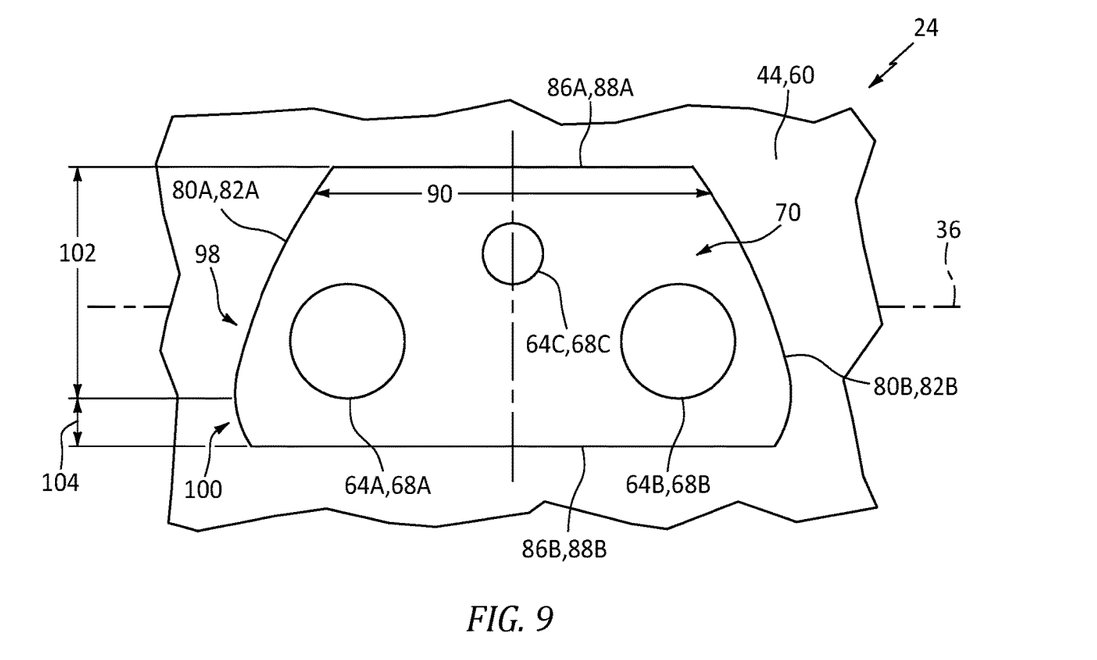
FIGS. 9 and 10 are illustrations of side portions of the journal bearing configured with various different converging and/or diverging geometries.

In some embodiments, referring to FIG. 9, at least a portion or an entirety of the groove side 82/the groove side surface 80 may be concave when viewed, for example, in the reference plane. In other embodiments, referring to FIG. 10, at least a portion or the entirety of the groove side 82/the groove side surface 80 may be convex when viewed, for example, in the reference plane.

Figure 10:
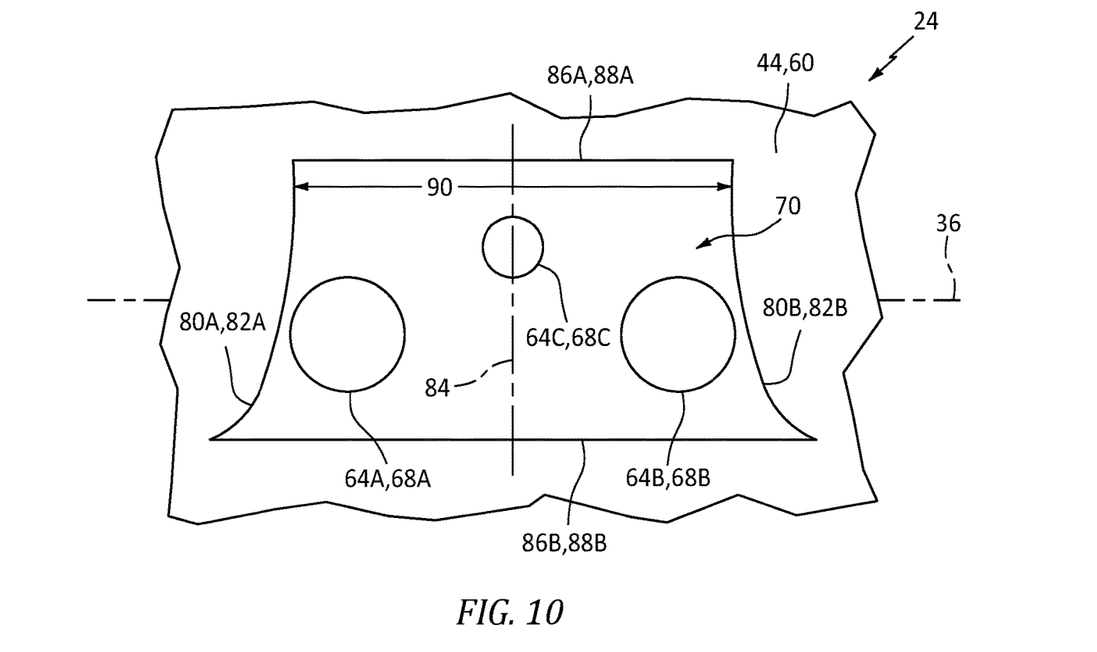

In some embodiments, referring to FIGS. 5 and 10, the value of the axial width 90 of the bearing groove 70 may continuously (or incrementally) decrease as the bearing groove 70 extends from the groove second end 86B to the groove first end 86A. In other embodiments, referring to FIG. 9, the value of the axial width 90 of a primary portion 98 of the bearing groove 70 may decrease as the bearing groove 70 extends longitudinally towards the groove first end 86A. The value of the axial width 90 of a secondary portion 100 of the bearing groove 70, however, may increase (or stay the same) as the bearing groove 70 extends longitudinally towards the groove first end 86A. In the embodiment of FIG. 9, this secondary portion 100 of the bearing groove 70 is located at the groove second end 86B and the primary portion 98 of the bearing groove 70 is located at the groove first end 86A. A longitudinal length 102 of the primary portion 98 of the bearing groove 70 may be different (e.g., larger) than a longitudinal length 104 of the secondary portion 100. For example, the primary portion longitudinal length 102 may be at least two times (2×), five times (5×), ten times (10×) longer than the secondary portion longitudinal length 104. The present disclosure, however, is not limited to such an exemplary dimensional relationship.

In some embodiments, referring to FIGS. 5, 9 and 10, one or each of the grooves ends 86 may follow a straight trajectory between the groove sides 82. The present disclosure, however, is not limited to such an exemplary configuration.

Figure 11A:
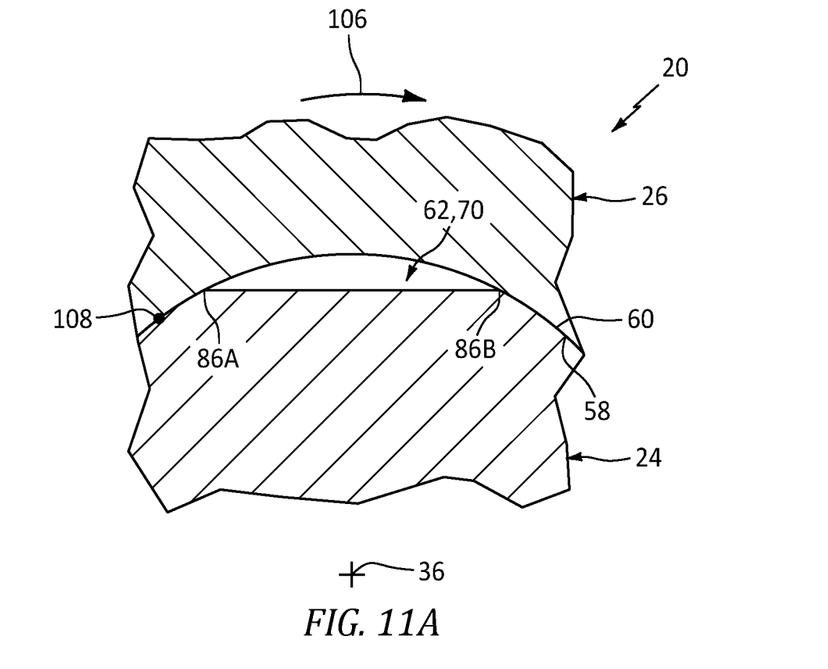
FIG. 11A is a side sectional illustration of a portion of the rotational equipment apparatus during operation with the rotor rotating in a first direction.
Figure 11B:
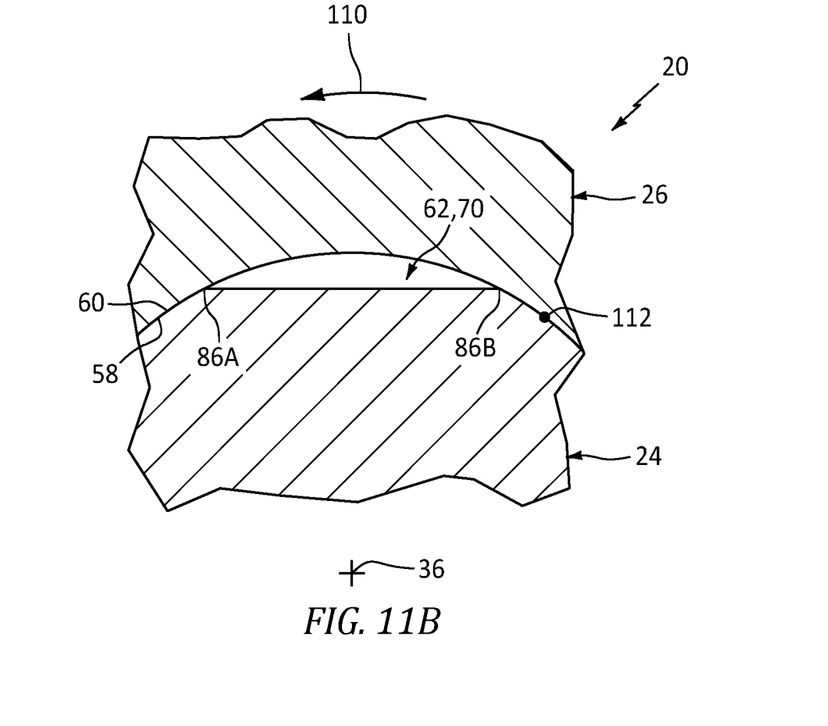
FIG. 11B is a side sectional illustration of a portion of the rotational equipment apparatus during operation with the rotor rotating in a second direction.

In some embodiments, referring to FIG. 11A, the groove first end 86A may be located forward/upstream of the groove second end 86B. The rotor 26, for example, may be configured to rotate in a first direction 106 (e.g., clockwise in FIG. 11A) about the rotational axis 36 where a point 108 on the rotor inner surface 58 passes the groove first end 86A before the groove second end 86B. In other embodiments, referring to FIG. 11B, the groove second end 86B may be located forward/upstream of the groove first end 86A. The rotor 26, for example, may be configured to rotate in a second direction 110 (e.g., counter-clockwise in FIG. 11B) about the rotational axis 36 where a point 112 on the rotor inner surface 58 passes the groove second end 86B before the groove first end 86A. In such embodiments, the rotation of the rotor 26 may pull (e.g., via friction) the lubricant through the lubricant cavity 62 towards the groove second end 86B. This may further facilitate keeping the lubricant cavity 62 (e.g., substantially) full of lubricant to reduce chances of cavitation.

Figure 12:
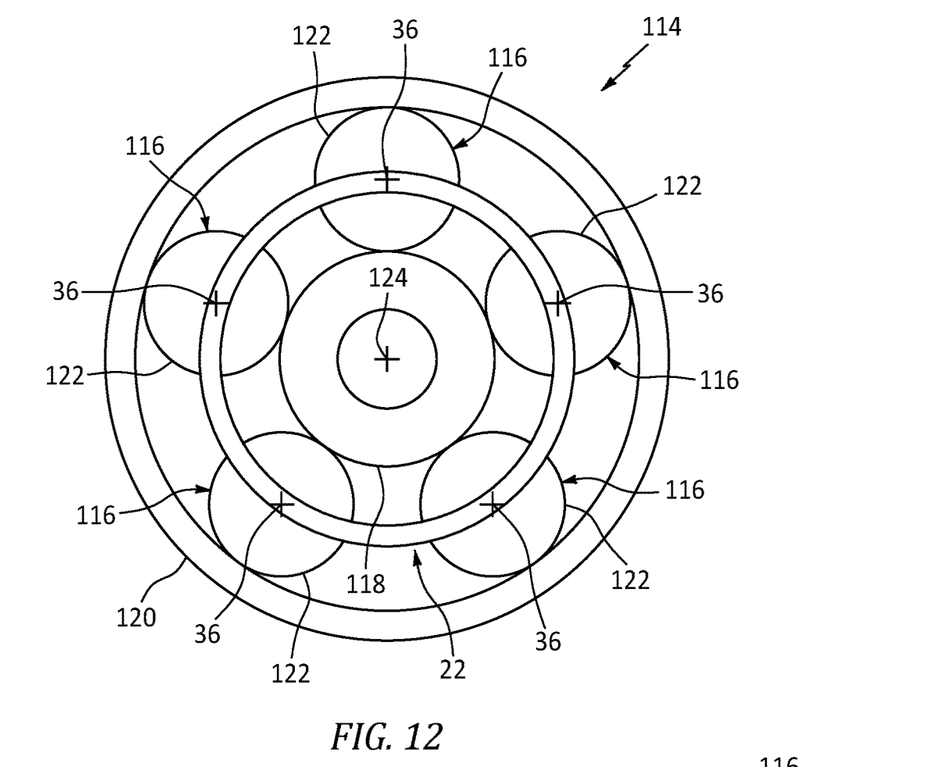
FIG. 12 is a schematic illustration of an epicyclic geartrain.

FIG. 12 illustrates an epicyclic geartrain 114 with which the rotational equipment apparatus 20 may be included. This epicyclic geartrain 114 includes the support structure 22 and a plurality of rotor assemblies 116, where each of the rotor assembly 116 of FIG. 1 includes a respective rotor 26 and a respective journal bearing 24. The epicyclic geartrain 114 of FIG. 12 also includes a center gear 118 (e.g., a sun gear) and a ring gear 120. Here, each rotor 26 of FIG. 1 is configured as and referred to below as an intermediate gear 122 (e.g., a planet or star gear). The intermediate gears 122 of FIG. 12 are distributed circumferentially about and meshed with the center gear 118, which center gear 118 is rotatable about an axial centerline 124. The ring gear 120 circumscribes and is meshed with the intermediate gears 122, which ring gear 120 of FIG. 12 is coaxial with (and may be rotatable about) the axial centerline 124. Where the epicyclic geartrain 114 is configured as a planetary geartrain, the center gear 118 may be coupled to an input (e.g., an input shaft) and the support structure 22 (e.g., a carrier) may be coupled to an output (e.g., an output shaft). Where the epicyclic geartrain 114 is configured as a star geartrain, the center gear 118 may be coupled to the input and the ring gear 120 may be coupled to the output. Of course, the input and the output may be reversed depending upon the desired speed differential.

Figure 13:
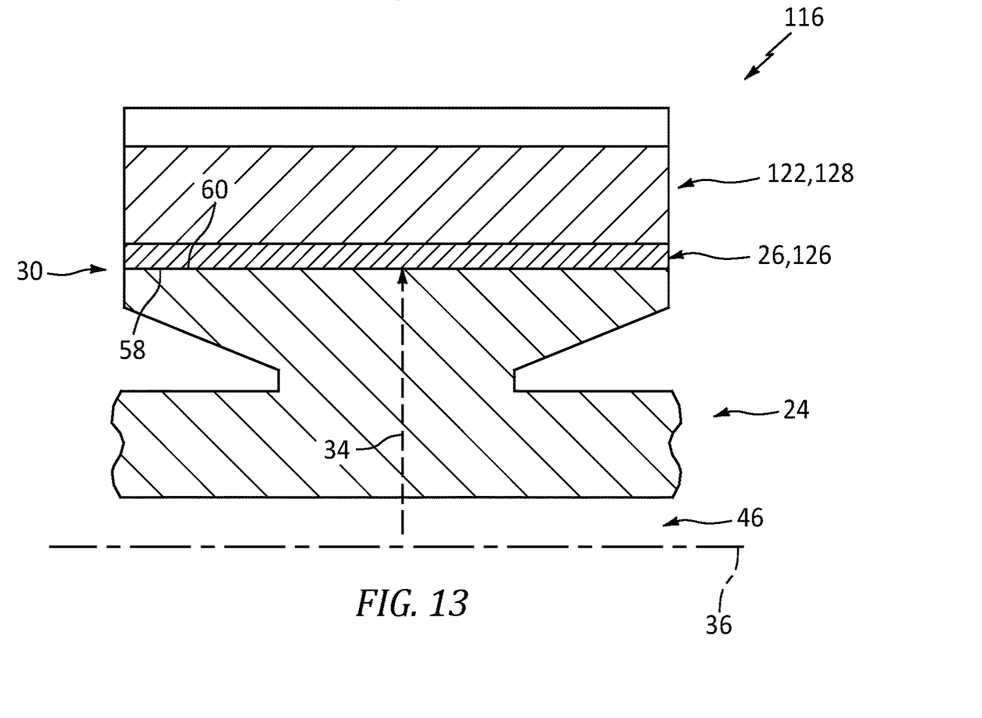
FIG. 13 is a side sectional illustration of a portion of the rotational equipment apparatus where the rotor is configured as a sleeve between the journal bearing and another rotating element.

Each intermediate gear 122 is described above as being configured as a respective rotor 26. In other embodiments however, referring to FIG. 13, the rotor 26 may be configured as a (e.g., wear) sleeve 126 (e.g., a bushing) between a rotating element 128 (e.g., the intermediate gear 122) and the journal bearing 24. In such embodiments, the rotor 26 (e.g., the sleeve 126) may be fixedly attached (e.g., press fit, bonded, etc.) to the rotating element 128 such that the rotor 26 rotates with the rotating element 128.

Figure 14:
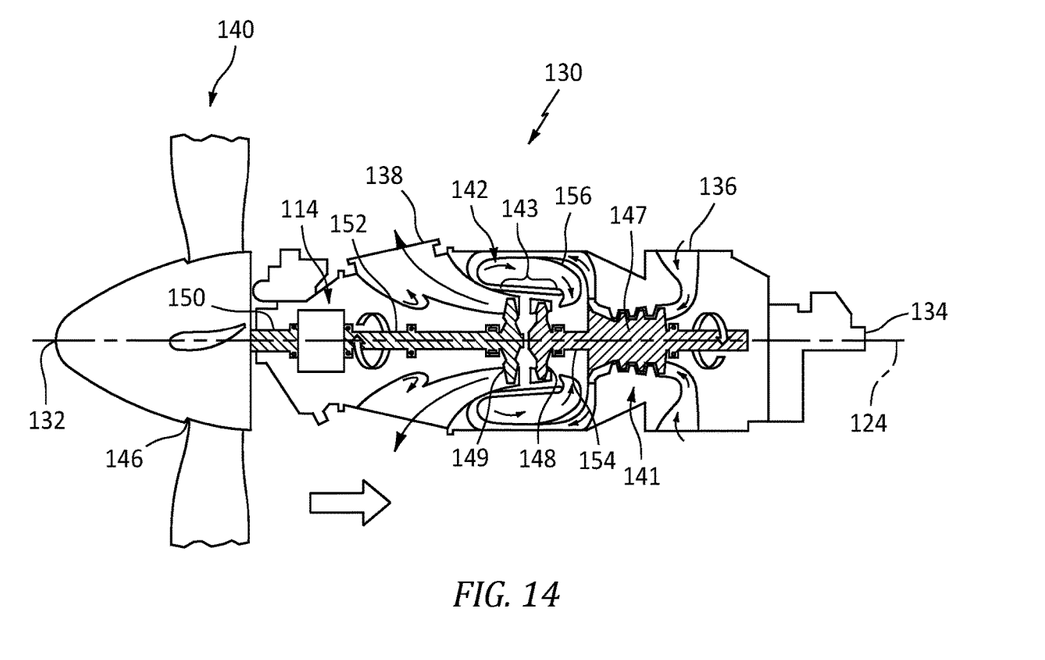
FIG. 14 is a schematic illustration of a turboprop gas turbine engine.

FIG. 14 illustrates an example of the turbine engine with which the rotational equipment apparatus 20 may be configured. This turbine engine is configured as a turboprop gas turbine engine 130. This turbine engine 130 of FIG. 14 extends axially along the axial centerline 124 between a forward end 132 of the turbine engine 130 and an aft end 134 of the turbine engine 130. The turbine engine 130 of FIG. 14 includes an airflow inlet 136, an exhaust 138, a propulsor (e.g., a propeller) section 140, a compressor section 141, a combustion section 142 and a turbine section 143.

The airflow inlet 136 is towards the engine aft end 134, and aft of the turbine engine sections 140-143. The exhaust 138 is located towards the engine forward end 132, and axially between the propulsor section 140 and the turbine engine sections 141-143.

The propulsor section 140 includes a propulsor rotor 146; e.g., a propeller. The compressor section 141 includes a compressor rotor 147. The turbine section 143 includes a high pressure turbine (HPT) rotor 148 and a low pressure turbine (LPT) rotor 149, where the LPT rotor 149 may be referred to as a power turbine rotor and/or a free turbine rotor. Each of these turbine engine rotors 146-149 includes a plurality of rotor blades arranged circumferentially about and connected to one or more respective rotor disks or hubs.

The propulsor rotor 146 of FIG. 14 is connected to the LPT rotor 149 sequentially through a propulsor shaft 150, a geartrain (e.g., a transmission) and a low speed shaft 152, where the geartrain may be configured as the epicyclic geartrain 114 of FIG. 12. The compressor rotor 147 is connected to the HPT rotor 148 through a high speed shaft 154.

During turbine engine operation, air enters the turbine engine 130 through the airflow inlet 136. This air is directed into a core flowpath which extends sequentially from the airflow inlet 136, through the engine sections 141-143 (e.g., an engine core), to the exhaust 138. The air within this core flowpath may be referred to as "core air".

The core air is compressed by the compressor rotor 147 and directed into a combustion chamber of a combustor 156 in the combustion section 142. Fuel is injected into the combustion chamber and mixed with the compressed core air to provide a fuel-air mixture. This fuel-air mixture is ignited and combustion products thereof flow through and sequentially cause the HPT rotor 148 and the LPT rotor 149 to rotate. The rotation of the HPT rotor 148 drives rotation of the compressor rotor 147 and, thus, compression of air received from the airflow inlet 136. The rotation of the LPT rotor 149 drives rotation of the propulsor rotor 146, which propels air outside of the turbine engine 130 in an aft direction to provide forward aircraft thrust.

The apparatus 20, 114 may be included in various turbine engines other than the ones described above. The apparatus 20, 114, for example, may be included in a geared turbine engine where a gear train connects one or more shafts to one or more rotors in a fan section, a compressor section and/or any other engine section. Alternatively, the apparatus 20, 114 may be included in a turbine engine configured without a gear train; e.g., a direct drive turbine engine. The turbine engine may be configured with a single spool, with two spools, or with more than two spools. The turbine engine may be configured as a turbofan engine, a turbojet engine, a turboprop engine, a turboshaft engine, a propfan engine, a pusher fan engine, an auxiliary power unit (APU) or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
a journal bearing extending axially along and circumferentially about an axis, the journal bearing extending radially between an inner side and an outer side, and the journal bearing including a bore, a passage and a groove;
the bore extending axially within the journal bearing and formed by the inner side;
the passage extending radially within the journal bearing and fluidly coupled with the bore and the groove; and
the groove arranged at the outer side, the groove extending radially into the journal bearing to a groove bottom surface, the groove extending longitudinally within the journal bearing along the groove bottom surface between a first end and a second end, the groove extending axially within the journal bearing along the groove bottom surface between a first side and a second side, and an axial distance between the first side and the second side changing as the groove extends longitudinally between the first end and the second end;
wherein the groove bottom surface has an isosceles trapezoidal shape.

2. The apparatus of claim 1, wherein the axial distance of the groove decreases as the groove extends longitudinally away from the second end and towards the first end.

3. The apparatus of claim 2, wherein
the first end is an upstream end of the groove; and
the second end is a downstream end of the groove.

4. The apparatus of claim 2, wherein
the first end is a downstream end of the groove; and
the second end is an upstream end of the groove.

5. The apparatus of claim 1, wherein the axial distance decreases as the groove extends longitudinally from the second end.

6. The apparatus of claim 1, wherein the axial distance decreases as the groove extends longitudinally to the first end.

7. The apparatus of claim 1, wherein the first side converges towards the second side as the groove extends longitudinally between the second end and the first end.

8. The apparatus of claim 1, wherein
the first end of the groove has a straight geometry that extends axially from the first side to the second side;
the second end of the groove has a straight geometry that extends axially from the first side to the second side;
the first side of the groove has a straight geometry that extends longitudinally from the first end to the second end; and
the second side of the groove has a straight geometry that extends longitudinally from the first end to the second end.

9. The apparatus of claim 1, wherein an outlet from the passage to the groove is axially centered between the first side and the second side.

10. The apparatus of claim 1, further comprising a rotor mounted on and rotatably supported by the journal bearing.

11. The apparatus of claim 1, further comprising an epicyclic geartrain that includes the journal bearing.

12. An apparatus for a turbine engine, comprising:
a journal bearing extending axially along and circumferentially about an axis, the journal bearing extending radially between an inner side and an outer side, and the journal bearing including a bore, a first passage, a second passage and a groove;
the bore extending axially within the journal bearing and formed by the inner side;
the first passage extending radially within the journal bearing and fluidly coupled with the bore and the groove;
the second passage extending radially within the journal bearing and fluidly coupled with the bore and the groove; and
the groove arranged at the outer side, the groove extending longitudinally within the journal bearing between a first end and a second end, the groove extending axially within the journal bearing between a first side and a second side, and an axial distance between the first side and the second side changing as the groove extends longitudinally between the first end and the second end;
wherein a first outlet from the first passage to the groove is axially between a longitudinal centerline of the groove and the first side or the second side;
wherein a second outlet from the second passage to the groove is axially centered between the first side and the second side; and
wherein the first end is parallel with the second end, the first end has a straight geometry that extends axially from the first side to the second side, and the second end has a straight geometry that extends axially from the first side to the second side.

13. The apparatus of claim 12, wherein a first width of the first outlet is larger than a second width of the second outlet.

14. The apparatus of claim 12, wherein
the journal bearing further includes a third passage;
the third passage extends radially within the journal bearing and is fluidly coupled with the bore and the groove; and
a third outlet from the third passage to the groove is axially between the longitudinal centerline of the groove and the second side, and the first outlet is axially between the longitudinal centerline of the groove and the first side.

15. The apparatus of claim 14, wherein the first outlet and the third outlet are located longitudinally between the second outlet and the first end or the second end.

16. The apparatus of claim 12, wherein
the axial distance for a first portion of the groove decreases as the groove extends longitudinally away from the second end and towards the first end; and
the axial distance for a second portion of the groove increases as the groove extends longitudinally away from the second end and towards the first end.

17. The apparatus of claim 12, wherein at least one of the first side of the groove or the second side of the groove has a curved geometry.

18. The apparatus of claim 12, wherein at least one of the first side of the groove or the second side of the groove is concave.

19. The apparatus of claim 12, wherein at least one of the first side of the groove or the second side of the groove is convex.

20. An apparatus for a turbine engine, comprising:
a journal bearing extending axially along and circumferentially about an axis, the journal bearing including a bore and a passage;
a rotor mounted on the journal bearing and rotatable about the axis; and
a cavity formed by and extending radially between the journal bearing and the rotor, the cavity extending longitudinally between a first end and a second end, the cavity extending axially between a first side and a second side, and an axial distance between the first side and the second side changing as the cavity extends longitudinally between the first end and the second end;
wherein the rotor includes a groove that at least partially forms the cavity, the groove extends radially into the rotor to a groove bottom surface, and the groove bottom surface has an isosceles trapezoidal shape; and
wherein the passage extends radially within the journal bearing, and the passage is fluidly coupled with and between the bore and the cavity.

* * * * *